United States Patent [19]

Kanda et al.

[11] Patent Number: 4,516,327
[45] Date of Patent: May 14, 1985

[54] TOUCH SIGNAL PROBE

[75] Inventors: Yoshiro Kanda, Tochigi; Hironori Noguchi; Tadashi Ikeda, both of Kanagawa, all of Japan

[73] Assignee: Mitutoyo Mfg. Co., Ltd., Tokyo, Japan

[21] Appl. No.: 491,573

[22] Filed: May 4, 1983

[30] Foreign Application Priority Data

May 11, 1982 [JP] Japan ................................. 57-79678

[51] Int. Cl.³ .............................................. G01B 7/02
[52] U.S. Cl. ..................................... 33/169 R; 33/559
[58] Field of Search ............. 33/169 R, 174 L, 172 E, 33/174 Q; 409/125, 126

[56] References Cited

U.S. PATENT DOCUMENTS

| 4,270,275 | 6/1981 | McMurtry | 33/169 R X |
| 4,279,080 | 7/1981 | Nakaya | 33/169 R X |
| 4,360,973 | 11/1982 | McMurtry | 33/169 R X |

FOREIGN PATENT DOCUMENTS 913031  3/1982  U.S.S.R. ............................ 33/169 R

Primary Examiner—Harry N. Haroian
Attorney, Agent, or Firm—Koda and Androlia

[57] ABSTRACT

A touch signal probe used in a coordinate measuring instrument or the like having a probe to brought into contact with a workpiece to be measured and outputting an electrical signal when in contact with the workpiece. The probe includes a probe case for tiltably and vertically movably holding the probe, a top plate affixed to the end portion of the probe case and having a shank, a stationary plate housed in the probe for fixing and holding a top end portion of the probe, an abutting ball and an engaging ball which are affixed to the stationary plate, a side receiving seat affixed to the probe case for being abutted against by the abutting ball to control the movement of the stationary plate in the lateral direction, an engagable seat affixed to the probe case having an engageable groove to be abutted thereagainst by said engaging ball at two points for controlling the position of the stationary plate in the lateral direction, three contact point balls affixed to the stationary plate at substantially equaliangular intervals, three stationary contact points affixed to the bottom receiving seat in opposed relations to the contact balls and biasing means for urgingly biasing the stationary plate.

3 Claims, 7 Drawing Figures

TOUCH SIGNAL PROBE

BACKGROUND OF THE INVENTION

1. Field of the Invention

This invention relates to touch signal probes, and more particularly to improvements in a touch signal probe for electrically detecting contact with a workpiece to be measured.

2. Description of the Prior Art

There has heretofore been well known a three-dimensional measuring instrument for measuring the size and contour of a workpiece to be measured which is rested on measuring base board or a device for measuring a positional relationship between a tool rest and a workpiece on a machine tool. In each of the measuring devices of the type described, a touch signal probe is mounted to a movable bed movable in a desired direction with respect to the workpiece to be measured. The touch signal probe outputs an electric signal upon contact with the workpiece to be measured to cause the measuring instrument to conduct an accurate measuring action.

When the probe comes into contact with a workpiece to be measured, the touch signal probe of the type described tilts to conduct a contact-detection action. Thereafter, when released from the workpiece to be measured, the touch signal probe must be accurately returned to the original point for maintaining a highly accurate measuring. In the conventional touch signal probe, a probe to come into contact with the workpiece to be measured is tiltably and vertically movably housed and held in a probe case. When the probe comes into contact with the workpiece to be measured and vertically moved or tilted, this contact is electrically detected and a desired measuring action is conducted.

There have heretofore been proposed various types of the aforesaid probes. In each of these conventional touch signal probes, mainly the probe is biased in a predetermined direction by a means such as a spring and positioned in its static condition. However, the conventional touch signal probes have been disadvantageous in that, in order to hold the probe in a predetermined stationary position, a complicated construction is needed, working becomes troublesome, and an unstable static condition results, thus adversely affecting the measuring accuracy and so forth.

Since, in the conventional touch signal probe, the position thereof in the vertical direction and the lateral direction has been controlled by means of one and the same member and also one and the same biasing means, such disadvantages have been presented that controls of the positions in both the directions interfere with each other and so forth, and become unsatisfactory, whereby shifts in the positions occur and it becomes difficult for the probe to accurately return to the original point, thereby causing errors in the measuring and the like.

Further, in the conventional touch signal probe, there has been such a disadvantage that, if the static condition of the probe after it has returned to the original point is improved, the overstroke of the probe becomes small, so that both the static condition of the probe after returning to the original point and the overstroke cannot be improved simultaneously.

Further, the conventional touch signal probe has been disadvantageous in that the probe becomes large-sized and heavy-weighted. Because of this, there has occurred the drawback that the movable bed mounted thereto with the probe must be made touch in construction and the controllability is deteriorated.

SUMMARY OF THE INVENTION

The present invention has been developed to obviate the above-described disadvantages of the prior art and has as its object the provision of an improved touch signal probe being very simplified in construction, capable of obtaining a stable and accurate static condition thereof after returning to the original point, expanding the overstroke thereof and further, rendering compact in size.

To achieve the above-described object, the present invention is characterized by: a probe case for tiltably and vertically movably holding a probe to be brought into contact with a workpiece to be measured; a top plate affixed to the top end portion of the probe case and having a shank engageable or disengageable with a movable bed; a stationary plate housed in the probe case, for fixing and holding the top end portion of the probe; a bottom receiving seat affixed to the bottom portion of the probe case, for holding the stationary plate; an abutting ball and an engaging ball, both of which are affixed to the stationary plate and have the side peripheral edges thereof projecting from the stationary plate in the lateral directions; a side receiving seat affixed to the probe case, for coming into abutting contact with the abutting ball to control the movement of the stationary plate in the lateral direction; an engageable seat affixed to the probe case, having an engageable groove allowing the engaging ball to abut thereagainst at two points to control the position of the stationary plate in the lateral direction; three contact point balls affixed to the stationary plate at substantially equiangular intervals and having the under peripheral edges thereof projecting downwardly from the stationary plate; three stationary contact points affixed to the bottom receiving seat in opposed relations to the contact point balls; a first biasing means for urgingly biasing the stationary plate toward the bottom receiving seat; and a second biasing means urgingly biasing the stationary plate toward the side receiving seat and the engageable seat.

DETAILED DESCRIPTION OF THE PREFERRED EMBODIMENTS

Description will hereunder be given of the preferred embodiments of the present invention with reference to the drawings.

Figure 1:
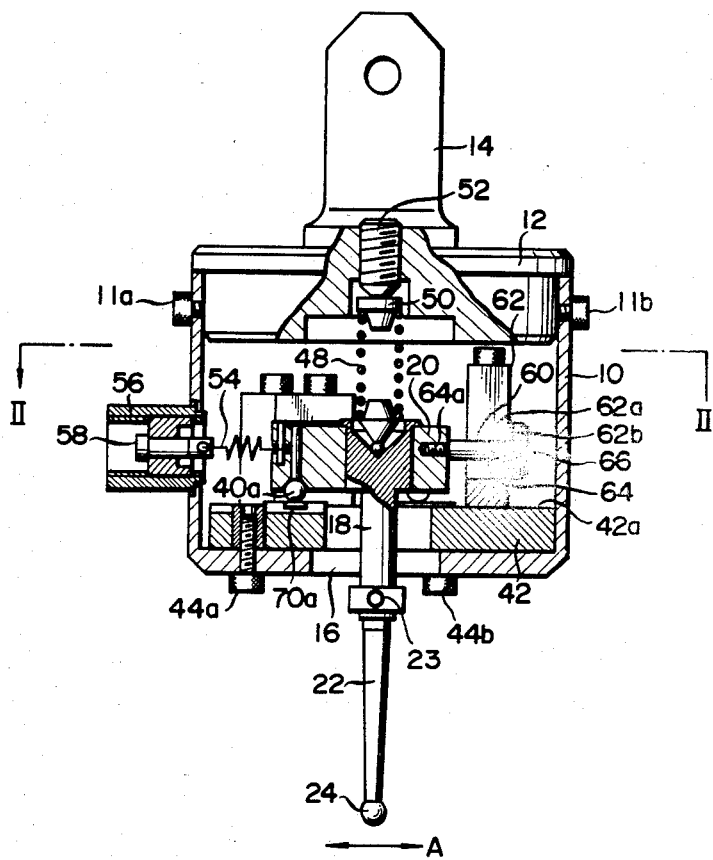
FIG. 1 is a sectional view of the essential portions showing a preferred first embodiment of the touch signal probe according to the present invention.
Figure 2:
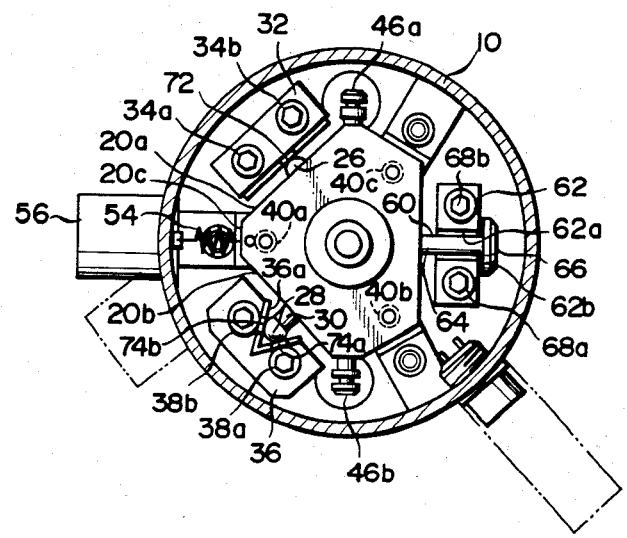
FIG. 2 is a sectional view taken along the line II—II in FIG. 1.

FIGS. 1 and 2 show the preferred first embodiment of the touch signal probe according to the present invention.

In the drawing, a substantially disc cover-shaped top receiving bed 12 is affixed to the top end opening of a cylindrical case-shaped probe case 10 being open at the top end thereof through screws 11a and 11b, and this top receiving bed 12 is upwardly projectingly provided thereon with a shank 14 for being engageable with or disengageable from a movable bed, not shown.

An opening 16 is formed at a portion of the probe case 10 opposite to the shank 14, and a probe shaft 18 is extended through the opening 16 and held tiltably relative to the probe case 10. A stationary plate 20 is housed in the probe case 10, and the aforesaid probe shaft 18 is affixed to the stationary plate 20. A probe 22 is detachably fixed to the forward end of the probe shaft 18 through a screw 23, so that a desirable probe 22 can be fixed. Further, closely affixed to the projected end of the probe 22 is a ball 24 to be brought into contact with a workpiece to be measured.

According to the present invention, to accurately position and hold the stationary plate 20 in the probe case 10, a tilted position and a vertically moved position of the stationary plate 20 are controlled by position control members formed separately of each other. More specifically, the vertically moved position of the stationary plate 20 is supported by a bottom receiving seat for positioning and holding the undersurface of the stationary plate 20, and the tilted position of the stationary plate 20 is supported by a side receiving seat and an engageable seat for positioning and holding the side surface of the stationary plate 20. Description will hereunder be given of the holding of the probe shaft 18 (stationary plate 20) in the tilted and vertically moved conditions.

A substantially pentagonal column-shaped stationary plate 20 is provided on the top end portion of the probe shaft 18, an abutting ball 26 having a side peripheral edge projecting in the lateral direction of the stationary plate 20 is affixed to one side surface of the stationary plate 20, and further, an engaging ball 28 having a side peripheral edge projecting in the lateral direction of the stationary plate 20 is affixed to the other side surface of the stationary plate 20 through an engaging ball support arm 30.

Affixed to the probe case 10 through screws 34a and 34b is a side receiving seat 32 capable of abutting against the abutting ball 26 to control the lateral movement of the stationary plate 20. An engageable seat 36 having an engageable groove 36a for allowing the engaging ball 28 to abut thereagainst at two points thereof to control the position of the stationary plate 20 in the lateral direction is affixed to the probe case 10 through screws 38a and 38b. In consequence, the abutting ball 26 abuts against the side receiving seat 32 and the engaging ball 28 abuts against the engageable groove 36a of the engageable seat 36 at two points thereof, so that the stationary plate 20 can be supported in the lateral direction at three points, thereby enabling to control the lateral movement of the stationary plate 20.

Furthermore, three contact point balls 40a, 40b and 40c each having an under peripheral edge thereof projecting downwardly from the stationary plate 20 are affixed to the undersurface of the stationary plate 20 at substantially equiangular intervals, and a bottom receiving seat 42 formed of a disc and abutting against the aforesaid contact point balls 40a, 40b and 40c is affixed to the bottom face of the probe case 10 through screws 44a and 44b. In consequence, the contact point balls 40a, 40b and 40c abut against a bottom receiving surface 42a of the bottom receiving seat 42, so that the stationary plate 20 can be supported in the vertical direction by three points, thereby enabling to control the stationary plate 20 in the vertical movement.

In addition, the abutting ball 26, the engaging ball 28 and the contact point balls 40a, 40b and 40c are of spherical shapes, and the contact surfaces of the side receiving seat 32, the engageable groove 36a and the bottom receiving seat surface 42a are of planes, so that working can be easily conducted on the abutting ball 26, the engaging ball 28, the contact point balls 40a, 40b and 40c, the side receiving seat 32, the engageable groove 36a and the bottom receiving seat surface 42a, thus enabling to reduce the costs. Further, the abutting ball 26, the engaging ball 28 and the contact point balls 40a, 40b and 40c slide on the contact surfaces of the side receiving seat 32, the engageable groove 36a and the bottom receiving seat surface 42a, respectively, so that the contact surfaces can be cleaned, thus enabling to eliminate a possibility of conduction failure.

To prevent irregular movements of the stationary plate 20 held by the bottom receiving seat 42, the side receiving seat 32 and the engageable seat 36 and restore the stationary plate 20 from the tilted position, a first and a second biasing means are provided for biasing the stationary plate 20 toward the bottom receiving seat 42, the side receiving seat 32 and the engageable seat 36. Description will now be given of the first and the second biasing means.

The first biasing means is provided for urgingly biasing under peripheral edges of the contact point balls 40a, 40b and 40c toward the bottom receiving seat surafce 42a of the bottom receiving seat 42. In the embodiment, the first biasing means comprises: two tensile springs 46a and 46b, each of which are secured at one end thereof to each one of the opposite end portions of the stationary plate 20 and at the other end thereof to the bottom receiving seat 42; and a compression spring 48 confined between the top receiving bed 12 and the stationary plate 20. More specifically, as shown in FIGS. 1 and 2, the first biasing means comprises: two tensile spring 46a and 46b, each of which are secured at one end thereof to each one of the opposite end portions of the stationary plate 20 and at the other end thereof to the bottom receiving seat 42, for tensionally biasing the stationary plate 20 toward the bottom receiving seat 42, for tensionally biasing the stationary plate 20 toward the bottom receiving seat surface 42a; and a compression spring 48 engaged at one end thereof with the central portion of the top plate 12 and engaged at the other end thereof with the central portion of the stationary plate 20, for urgingly biasing the stationary plate 20 toward the bottom receiving seat surface 42a. In addition, to make the biasing force of the compression spring 48 to be adjustable, the top plate 12 is provided with a spring receiver 50 to receive one end portion of the compression spring 48 and an adjusting screw 52 to vertically move the spring receiver 50, so that the biasing force of the compression spring 48 can be adjusted by adjusting the adjusting screw 52 in its linearly movable position. Furthermore, to urgingly bias the side peripheral edges of the abutting ball 26 and the engaging ball 28 toward the side receiving seat 32 and the engageable groove 36a, the second biasing means is provided. In the embodiment, the second biasing means comprises a tensile spring 54 fixed at one end thereof to the stationary plate 20 and at the other end thereof to the probe case 10. More specifically, as shown in FIGS. 1 and 2, the second biasing means for urgingly biasing the stationary plate 20 toward the side receiving seat 32 and the engageable seat 36 comprises a tensile spring 54 engaged at one end thereof with a forward end face 20c disposed between two side surfaces 20a and 20b of the stationary plate 20 and at the other end thereof with a spring receiving portion 56 of the probe case 10. Further, to make the biasing force of the tensile spring 54 to be adjustable, the probe case 10 is provided with a spring receiving portion 56 and a spring receiving screw 58 adjustably fixed in the spring receiving portion 56 and secured thereto with the other end of the tensile spring 54, so that the biasing force of the tensile spring 54 can be adjusted by adjusting the spring receiving screw 58 in its linearly movable position.

In consequence, the stationary plate 20 is vertically movably and tiltably held in the probe case 10 as described above.

Further, in the embodiment, a stopper member 60 is projected from a side surface of the stationary plate 20 opposite to the tensile spring 54, a stopper receiving member 62 engageable with the stopper member 60 is provided on the bottom receiving seat 42 of the probe case 10. Engagement of the stopper member 60 with the stopper receiving member 62 prevents an excessive tilting of the stationary plate 20, so that the probe shaft 18 can be prevented from being excessively tilted. More specifically, the stopper member 60 comprises a rod-like body 64 and a disc-shaped head 66 provided at one end of the body 64. The forward end portion 64a of the body 64 is coupled and fixed to the stationary plate 20, and the stopper receiving member 62 is of a block shape formed at the central portion thereof with an engageable groove 62, and affixed to the bottom receiving seat 42 through screws 68a and 68b. Then, the body 64 of the stopper member 60 is loosely inserted through the engageable groove 62 of the stopper receiving member 62, and the rear surface of the head 66 of the stopper member 60 is opposed to an end face 62 of the stopper receiving member 62. For this, when the stationary plate 20 is tilted in a direction between the front and rear of the paper in FIG. 1, the body 64 of the stopper member 60 is engaged with the groove walls of the stopper receiving member 62, so that the stationary plate 20 can be prevented from being excessively tilted. Furthermore, when the stationary plate 20 is tilted in a direction indicated by a double-headed arrow A, perpendicularly intersecting the aforesaid direction, the head 66 of the stopper member 60 is abutted against and engaged with an end face 62b of the stopper receiving member 62, so that the stationary plate 20 can be prevented from being excessively tilted.

As described above, the probe shaft 18 can be vertically movably and tiltably held, and the static position of the probe shaft 18 can be stabilized by side peripheral edges of the abutting ball 26 and the engaging ball 28, and the under peripheral edges of the contact point balls 40a, 40b and 40c. According to the present invention, the controls of the positions in the vertical direction and the lateral direction of the stationary plate 20 to fix the probe 22 (prove shaft 18) are separately conducted from each other, and, in order to engage the stationary plate 20 both in the vertical direction and the lateral direction, respectively, there are provided the contact point balls 40a, 40b and 40c each having an under peripheral edge, and the abutting ball 26 and the engaging ball 28 each having a side peripheral edge, so that the satisfactory static condition of the probe 22 after returning to the original point can be obtained and the stable positioning of the probe 22 can be conducted, with a simplified construction.

Description will hereunder be given of a detecting a contact between the probe 18 and the workpiece to be measured.

In the embodiment, the contact point balls 40a, 40b, 40c and the bottom receiving seat surface 42a constitute pairs of main contact points. More specifically, lower stationary contact points 70a, 70b and 70c to be brought into contact with the under peripheral edges of the contact point balls 40a, 40b and 40c are embedded in and fixed to the bottom receiving seat surface 42a of the bottom receiving seat 42. The contact point balls 40a, 40b and 40c, and the lower stationary contact points 70a, 70b and 70c constitute the pairs of main contact points of the touch signal probe.

Further, in the embodiment, the abutting ball 26, the engaging ball 28, the side receiving seat 32 and the engageable seat 36 constitute a pair of auxiliary contact points. More specifically, the auxiliary stationary contact point 72 to be brought into contact with the side peripheral edge of the aforesaid abutting ball 26 is embedded in and fixed to the side receiving seat 32, and two auxiliary stationary contact points 74a and 74b to be brought into contact with the side peripheral edges of the aforesaid engaging ball 28 are embedded in and fixed to the engageable groove 36a of the engageable seat 36, whereby the abutting ball 26, the engaging ball 28, the auxiliary stationary contact points 72, 74a and 74b constitute a pair of auxiliary contact points of the touch signal probe.

As the result, six pairs of contact points of the touch signal probe are formed by the three pairs of main contact points and the three pairs of auxiliary contact points, so that the measuring accuracy can be improved. More specifically, a fine tilting of the probe shaft 18 can be detected, so that the instantaneous detecting performance can be improved. Further, the return of the probe to the original point can be accurately detected.

Then, the contact point balls 40a, 40b and 40c, and the lower stationary contact points 70a, 70b and 70c are arranged in series and in directions alternate with one another, and further, the abutting ball 26 and the engaging ball 28, and the auxiliary stationary contact points 72, 74a and 74b are arranged in series and in directions alternate with one another, whereby the sets of main contact points and the pairs of auxiliary contact points constitute a serial circuit, so that a contact between the probe 22 affixed to the forward end of the probe shaft 18 and the object to be measured can be detected by a contact detector, not shown. More specifically, in a non-contact condition between the probe 22 and the workpiece to be measured, all of the three pairs of main contact points, i.e., (the contact point ball 40a, the lower stationary contact point 70a), (the contact point ball 40b, the lower stationary contact point 70b) and (the contact point ball 40c, the lower stationary contact point 70c) are brought into contact with each other, and further, all of the three pairs of auxiliary contact points, i.e., (the abutting ball 26, the auxiliary stationary contact point 72), (the engaging ball 28, the auxiliary stationary contact point 74a) and (the engaging ball 28, the auxiliary stationary contact point 74b) are brought into contact with each other, whereby the contact detector is in a conducted condition. With this arrangement, when the probe 22 comes into contact with the workpiece to be measured, the probe shaft 18 tilts or vertically moves, whereby anyone pair of contact points out of the three sets of main contact points and the three auxiliary contact points is separated from each other. In consequence, the contact detector comes into a non-conducted condition, so that the contact between the probe 22 and the workpiece to be measured cannot be accurately detected.

The embodiment of the present invention is of the above-described arrangement and description will now be given of action thereof.

In FIGS. 1 and 2, the probe 22 is tiltably and vertically movably held by the tensile springs 46a, 46b, the compression spring 48 and the tensile spring 54, the under peripheral edges of the contact point balls 40a, 40b and 40c are brought into contact with the bottom receiving seat surface 42a by the tensile springs 46a, 46b, the compression spring 48 and the tensile spring 54, and the side peripheral edges of the abutting ball 26 and engaging ball 28 are brought into contact with the side receiving seat 32 and the engageable seat 36, so that the static position of the probe 22 can be stabilized. Further, all of the three pairs of main contact points, i.e., (the contact point ball 40a, the lower stationary contact point 70a), (the contact point ball 40b, the lower stationary contact point 70b) and (the contact point ball 40c, the lower stationary contact point 70c) are brought into contact with each other, and further, all of the three pairs of auxiliary contact points, i.e., (the abutting ball 26, the auxiliary stationary contact point 72), (the engaging ball 28, the auxiliary stationary contact point 74a) and (the engaging ball 28, the auxiliary stationary contact point 74b) are brought into contact with each other, whereby the contact detector is in the conducted condition.

Then, when the probe 22 affixed to the forward end of the probe shaft 18 comes into contact with the workpiece to be measured, the probe shaft 18 tilts or vertically moves as described above, anyone pair of contact points out of the three pairs of main contact points and the three auxiliary contact points is separated from each other, so that the contact can be detected by the contact detector. At this time, even if the movable bed over-runs, the probe shaft 18 can tilt relative to the probe case 10, so that the probe shaft 18 and the probe 22 can be prevented from being damaged. Further, the probe shaft 18 is controlled not to tilt beyond a predetermined angle by the stopper member 60 and the stopper receiving member 62, so that the tensile springs 46a, 46b, the compression spring 48 and the tensile spring 54 can be prevented from being distored or damaged.

Then, when the probe 22 is released from the workpiece to be measured, the probe shaft 18 is quickly restored to the neutral position by the biasing forces of the tensile springs 46a, 46b, the compression spring 48 and the tensile spring 54, and, the side peripheral edges of the abutting ball 26 and the engaging ball 28 again come into contact with the side receiving seat 32 and the engageable seat 36, and the under peripheral edges of the contact point balls 40a, 40b and 40c come into contact with the bottom receiving seat surface 42a of the bottom receiving seat surface 42a of the bottom receiving seat 42, whereby the probe shaft 18 is stabilized in the static position and the contact detector returns to the conducted condition.

As described above, according to the first embodiment of the present invention, the satisfactory return of the probe to the original point and the stabilized static condition of the probe can be obtained, with the simplified construction. Furthermore, the overstroke of the probe can be expanded. Further, the posture of the probe is free from being restricted.

Furthermore, the bottom receiving seat to control the vertical movement of the stationary plate, and the side receiving seat and the engageable seat which control the lateral movement of the stationary plate are provided independently of each other, and further, the stationary plate is biased toward the bottom receiving seat, the side receiving seat and the engageable seat by both the first and the second biasing means without interfering therebetween, so as to be positioned and held without being shifted in position, so that the stable and accurate static condition after returning to the original point of the stationary plate, i.e., the probe can be obtained, thus enabling to improve the measuring accuracy.

Additionally, according to the first embodiment, the respective movements in the vertical direction and the lateral direction of the stationary plate are conducted by position control members formed independently of each other, the measuring pressure, i.e., the contact pressure between the probe and the workpiece to be measured can be made low and adjusted to the optimum value, and the tilting and the like of the stationary plate and the probe by gravity can be prevented, so that an accurate measuring can be carried out without being interfered by the posture of the probe. Further, the respective position control members are each provided with the first and the second biasing means independently of each other. Owing to this, even if the allowable tilting value is increased, the instantaneous return of the probe to the original point can be attained, so that a so-called all-around over-run value can be increased.

Furthermore, according to the first embodiment, the stationary plate, the bottom receiving seat, the side receiving seat and the engageable seat can be formed into very simplified constructions by use of the planar plates and the like as aforesaid, so that the manufacture of parts for the touch signal probe can be facilitated. Moreover, the controls of the positions of the stationary plate are conducted in the vertical direction and the lateral direction independently of each other, and no particular relations exist therebetween, whereby the both position control members need not be assembled with each other under a super high accuracy in positional relationship therebetween, thereby enabling to provide the touch signal probe at a low cost.

Further, in the first embodiment, the first biasing means is constituted by the two tensile springs and one compression spring, but, may be constituted by only two tensile springs provided on the opposite end portions of the stationary plate, with no compression spring being used.

Additionally, according to the first embodiment, the touch signal probe being compact in size and light in weight can be provided. In consequence, necessity for making the movable bed to be tough in construction can be eliminated, so that the measuring instrument can be lowered in cost and the controllability can be improved.

Further, in the first embodiment, the three sets of main contact points and the three sets of auxiliary contact points constitute the pairs of contact points of the touch signal probe, however, either the three pairs of main contact points or the three pairs of auxiliary contact points can constitute the pairs of contact points of the touch signal probe.

Furthermore, in the first, embodiment, the side receiving seat 12 and the engageable seat 36 can control the movement in the lateral direction of the stationary plate 20 (probe shaft 18), and moreover, can prevent the stationary plate 20 (probe shaft 18) from rotating about the probe shaft.

Figure 3:
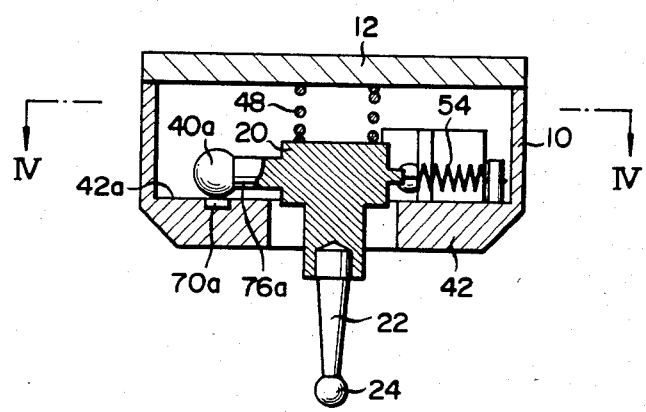
FIG. 3 is a sectional view of the essential portions showing a second embodiment.
Figure 4:
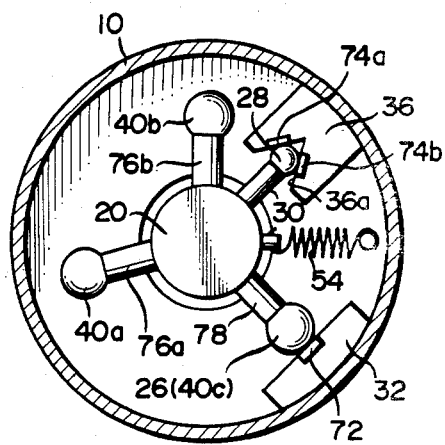
FIG. 4 is a sectional view taken along the line IV—IV in FIG. 3.

FIG. 3 shows the second embodiment of the present invention, and FIG. 4 shows a section thereof.

In the second embodiment, the under peripheral edge of the abutting ball 26 is used for replacing one 40c of the contact point balls. More specifically, the contact point balls 40a and 40b are affixed to the stationary plate 20 through contact support arms 76a and 76b, respectively, and further, the abutting ball 26 (contact point ball 40c) and the engaging ball 28 are solidly secured to the stationary plate 20 through an abutting ball support arm 78 and the engaging ball support arm 30, respectively. The static position of the probe shaft 18 can be stabi.lized by the under peripheral edges of the contact point balls 40a, 40b, the under peripheral edge of the abutting ball 26, and the side peripheral edge of the side peripheral edge engaging ball 28. In consequence, the abutting ball 26 is caused to support the stationary plate 20 in two directions, so that the probe shaft 18 can be reliably stabilized by use of four balls, thus enabling to render the touch signal probe compact in size.

In the second embodiment, in the same manner as in the first embodiment, a satisfactory static condition of the probe after its return to the original point and a statilized static condition of the probe can be attained with a simplified construction, and the overstroke of the probe can be expanded.

Figure 5:
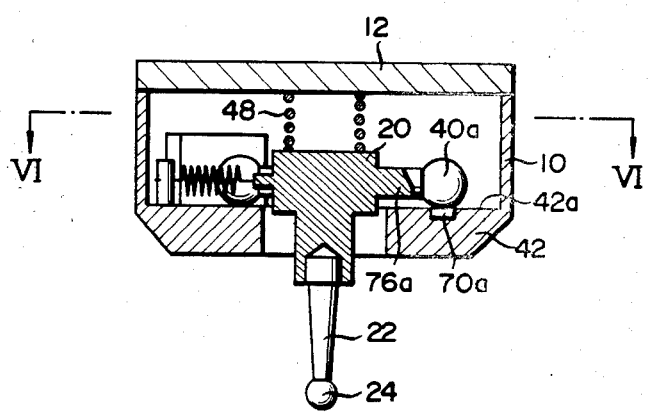
FIG. 5 is a sectional view of the essential portions showing a third embodiment.
Figure 6:
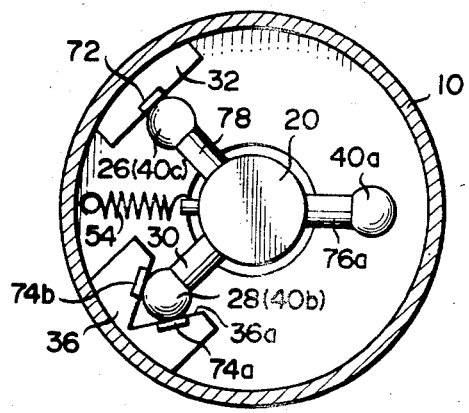
FIG. 6 is a sectional view taken along the line VI—VI in FIG. 5.

FIG. 5 shows the third embodiment of the present invention, and FIG. 6 shows a section thereof.

In the third embodiment, the under peripheral edge of the abutting ball 26 is used for replacing one 40c of the contact point balls, and further, the under peripheral edge of the engaging ball 28 is used for replacing one 40b of the contact point balls. More specifically, the contact point ball 40a is affixed to the stationary plate 20 through the contact point ball support arm 76a, and further, the abutting ball 26 (contact point ball 40c) and the engaging ball 28 (contact point ball 40b) are solidly secured to the stationary plate 20 through an abutting ball support arm 78 and the engaging ball support arm 30, respectively. Then, the static position of the probe shaft 18 can be stabilized by the under peripheral edge of the contact point ball 40a, the under peripheral edge of the abutting ball 26, the under peripheral edge and side peripheral edges of the side peripheral edge engaging ball 28. In consequence, the abutting ball 26 is caused to support the probe in two directions, and further, the engaging ball 28 is caused to support the probe in two directions, so that the static position of the probe can be reliably stabilized by use of three balls, thereby enabling to render the touch signal probe compact in size. Additionally, in FIG. 6, the tensile spring 54 may be interposed at any position between the engaging ball support arm 30 and the abutting ball support arm 78.

In the third embodiment, in the same manner as in the first embodiment, a satisfactory static condition of the probe after its return to the original point and a stabilized static condition of the probe can be attained with a simplified construction, and the overstroke of the probe can be expanded.

Further, in the third embodiment, shown in FIGS. 5 and 6, three sets of main contact points and three pairs of auxiliary contact points can constitute the sets of the contact points of the touch signal probe. More specifically, the under peripheral edge of the abutting ball 26 (contact point ball 40c), the under peripheral edge of the engaging ball 28 (contact point ball 40b) and the under peripheral edge of the contact point ball 40a can constitute three sets of main contact points, and the side peripheral edge of the abutting ball 26 (contact point ball 40c) and the side peripheral edges of the engaging ball 28 (contact point ball 40b) can constitute three sets of auxiliary contact points. When the three sets of main contact points and the three sets of auxiliary contact points are connected in series, it becomes possible to accurately detect the return of the probe to the original point.

Figure 7:
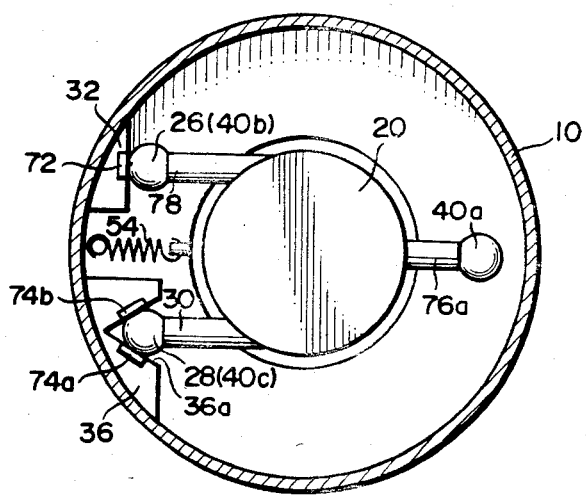
FIG. 7 is a sectional view of the essential portions showing a fourth embodiment.

In addition, FIG. 7 shows the fourth embodiment of the present invention, in which, in the same manner as in the third embodiment, the static position of the probe shaft 18 can be stabilized by the under peripheral edge of the contact point ball 40a, the under peripheral edge and side peripheral edge of the abutting ball 26, and the under peripheral edge and side peripheral edges of the engaging ball 28. In the fourth embodiment, the abutting ball support arm 78 and the engaging ball support arm 30 are disposed in parallel to each other, so that the touch signal probe can be rendered further compact in size.

As has been described hereinabove, with the touch signal probe according to the present invention, the satisfactory static condition of the probe after its return to the original point and the stabilized static condition of the probe can be attained with the simplified construction, and further, the touch signal probe being compact in size and light in weight can be provided. Moreover, the overstroke of the probe can be expanded.

What is claimed is:

1. A touch signal probe comprising:
 a probe case for tiltably and vertically movably holding said probe to be brought into contact with a workpiece to be measured;
 a top plate affixed to the top end portion of the probe case and having a shank engageable with or disengageable from a movable bed;
 a stationary plate housed in the probe case, for fixing and holding the top end portion of said probe;
 a bottom receiving seat affixed to the bottom of the probe case, for holding the stationary plate;
 an abutting ball and an engaging ball, which are affixed to the stationary plate and each having a side peripheral edge projecting from the stationary plate in the lateral direction and fixedly secured to the stationary plate;
 a side receiving seat affixed to the probe case, for being abutted against the abutting ball to control the movement of the stationary plate in the lateral direction;
 an engageable seat affixed to the probe case, having an engageable groove to be abutted thereagainst with said engaging ball at two points for controlling the position of the stationary plate in the lateral direction;
 three contact point balls affixed to the stationary plate at substantially equiangular intervals, each having an under peripheral edge projecting downwardly from the stationary plate and fixedly secured to the stationary plate;

three stationary contact points affixed to the bottom receiving seat in opposed relations to the contact point balls;

a first biasing means for urgingly biasing the stationary plate toward the bottom receiving seat; and a second biasing means for urgingly biasing the stationary plate toward the side receiving seat and the engageable seat.

2. A touch signal probe as set forth in claim 1, wherein at least one of said contact point balls comprises an under peripheral edge of the abutting ball of the stationary plate.

3. A touch signal probe as set forth in claim 1, wherein two of said contact point balls comprise an under peripheral edge of the abutting ball and an under peripheral edge of the engaging ball of the stationary plate.

* * * * *